Patented Nov. 24, 1953

2,660,542

UNITED STATES PATENT OFFICE 2,660,542

FLAMEPROOFED ARTICLE AND METHOD OF MAKING SAME

George E. Walter, Baltimore, Irwin Hornstein, East Riverdale, and Clarence A. Sheld, Baltimore, Md., assignors to The Glenn L. Martin Company, Middle River, Md., a corporation of Maryland No Drawing. Application November 26, 1948, Serial No. 62,235

5 Claims. (Cl. 117—136)

In our copending patent application, Serial No. 62,236, filed November 26, 1948, a novel method for flameproofing inflammable materials, particularly textiles of all kinds, is described. That method consists substantially in the preparation of polymerizable and/or polycondensable non-ionic organic flameproofing compounds providing their own resinous binder so that no foreign resinous binder is needed. These compounds include polymerizable and polycondensable non-ionic phosphorus compounds, and the application refers in particular to the preparation of halogenated polyalkene and dialkene esters of the oxygen acids of phosphorus, and more specifically, to the preparation of halogenated polytriallyl phosphates and polydialkene phosphonamides. The alkene esters may also be referred to as alkenyl esters, and therefore the terms "alkene" and "alkenyl" are to be regarded hereinafter as employed interchangeably. The application further includes polycondensed organic phosphorus compounds, for instance, a polycondensation product prepared by reacting di-bromopropyl phosphorus dichloride with ethylene glycol. Bromine is the preferred halogen giving flameproofing compounds of much greater effectiveness than chlorine. However, a useful modification of the method consists also in reacting sulphuryl chloride with an alkene phosphate monomer or the still unsaturated polymer. Part of the double bonds of the alkene phosphates serves the polymerization, the other part, the halogenation. In triallyl phosphate having three double bonds in the molecule, preferably two are used up by polymerization, one by halogenation. In general, there are two ways of carrying out the process, one consisting in part-halogenation of the monomer with subsequent polymerization, the other one consisting in part-polymerization with subsequent halogenation of the still unsaturated polymer. In either way, the resulting halogen-containing polymer must be of the soluble thermoplastic type, in order to be applicable in the form of a solution or water emulsion on the cloth. This often entails a definite problem, since many of the monomers in question, having more than one active double bond, tend to form thermosetting type, insoluble polymers. Incomplete polymerization, however, stopping just before the gelation of the crosslinking polymer is setting in, though it may provide solubility of the product, will decrease its permanence in laundering and drycleaning operations. One way of solving this problem consists in the fractionation of the incompletely polymerized products, i. e., the removal of the monomer, leading up to a probably highly branched, but not yet crosslinked, polymer of good permanence characteristics.

We have found now that it offers a distinct advantage when both, or at least one of the processes, polymerization and halogenation, is carried out directly on the material to be flameproofed. We have observed no deteriorating effect when this is done.

Not only the polymerization, but also the halogenation, in particular the bromination, tends to insolubilize the final product. In carrying out at least one of these processes directly on the textile, a higher degree of polymerization, and of permanence of the final product can be achieved. Here, not only branching, but actual crosslinking is easily attained, since no solution of the polymer is required in this process.

This process offers the following further advantages:

1. When the monomer is put on the textile, polymerization can be led exactly to the desired degree characterized by the desired bromine number, i. e., about 70. This process gives flameproofing finishes not only of superior permanence in laundering and drycleaning, but also of superior feel of the treated cloth, probably due to a different structure of the polymer.

2. We have observed also that the halogenation, particularly the bromination, carried out directly on the textile increases by itself the permanence by many times even when the polymerization is carried out prior to the application on the cloth. Thus, there are two distinct processes, the polymerization, and the halogenation on the material to be flameproofed, both of which exhibit a marked and favorable effect.

3. If the polymerization is carried out directly on the cloth, and followed by halogenation, the polymerization can be led to a further advanced stage than in the case of effecting the halogenation in the reaction vessel since the unbrominated polymer is still soluble at a degree of polymerization where the brominated polymer is not. In all cases, the result will be increased permanence of the finish.

Thus, one object of this invention is a process of permanently flameproofing inflammable materials of all kind.

Another object of this invention is the polymerization of organic flameproofing compounds on and in the material to be flameproofed, particularly on wood, and on natural and synthetic fibers, and textiles of all kinds. Another object is the polymerization and subsequent halogenation, particularly bromination, of organic phosphorus compounds on textiles. Another object is a process of flameproofing comprising the polymerization of a halogenated alkene ester of one of the oxygen acids of phosphorus on textiles. Another object is the halogenation of a polyalkene or dialkene amido phosphate on textiles to give a flameproof material.

Another object of the invention is the preparation of an organic phosphorus compound having at least one active double bond, polymerizing that compound, applying it on textiles, and halogenating it thereupon. Another object is the impregnation of textiles with a solution of an alkene or dialkene amido phosphate having at least two active double bonds, polymerizing, and subsequently halogenating on the cloth. Other and further objects will be apparent to those skilled in the art from the following detailed description.

This application is a continuation-in-part of the copending application of George E. Walter, Irwin Hornstein, and Clarence A. Sheld, entitled "Flameproofing Process," Serial No. 761,148, filed July 15, 1947, now abandoned.

The halogenation can be carried out by passing the cloth impregnated with the alkene phosphate through a suitable solution of the halogen, or through the halogen in its liquid state, or through a chamber containing the halogen in gaseous form. Bromine, as is stated above, is much more effective than chlorine, but all halogens are included in the method of this invention. Furthermore, in the copending application of George E. Walter and Irwin Hornstein, Serial No. 62,232, filed November 26, 1948, a method is described of adding chlorine on double bonds by treating them with sulphuryl chloride. Also this method can be applied with advantage, in order to introduce halogen into the unsaturated compound. Surprisingly, the treatment with sulphuryl chloride gives a much better flameproofer than the treatment with chlorine. It is possible that sulphur plays some part in the reaction.

The polymerization on the cloth is preferably carried out in a nitrogen atmosphere. The monomer can be applied on the cloth either in a solution of an organic solvent or in water emulsion.

A preferred way of carrying out the invention is the impregnation or coating of the material to be flameproofed with a triallyl phosphate solution containing a peroxide type catalyst, drying, polymerizing under nitrogen in a closed system, until the bromine number has dropped from the original value 220 to about 70, i. e., ⅓ of the original unsaturation, and subsequently brominating with bromine vapor, or a solution of bromine in carbon tetrachloride or ethylene dichloride. The following are specific examples of the process of our invention:

EXAMPLE I

Polymerization and bromination on cloth using bromine solution:

The material to be flameproofed is impregnated with a solution consisting of 50 parts of triallyl phosphate in 150 parts of benzene and containing 1.5 parts of benzoyl peroxide. The solvent is evaporated and the cloth placed in an atmosphere of nitrogen at 90° C. and polymerized for 30 minutes, that is, to such a stage wherein the insoluble finish has approximately one-third of the original number of double bonds still unsaturated and present as integral parts of the polymer chains. The bromine number is approximately 70.

The textile is now immersed in a bath of equal parts of bromine and carbon tetrachloride. The textile is quickly removed, the excess bromine squeezed out, and the cloth dipped into a solution of dilute alkali, rinsed with water and dried at 100°–110° C. The bromine pick-up is roughly 70 per cent by weight of the original triallyl phosphate pick-up.

The resulting textile is flameproof. It was boiled in water for three hours, and in 1 per cent potassium oleate solution for 1½ hours without losing its effectiveness. This finish cannot be leached out by water or organic solvents (dry-clean-proof).

In the polymerization stage, catalyst concentration, time, and temperature can be varied, but it is absolutely essential that unsaturation be left in the polymer chains. The tensile strength of the fabric is improved by this treatment. An evaluation of the tensile strength is given in the table following Example VI.

EXAMPLE II

Polymerization and bromination on cloth using bromine vapor:

The polymerization is carried out as in Example I. The bromination is performed by exposing the textile to bromine vapors for 30 minutes. The cloth is then dipped into a solution of dilute alkali, rinsed with water, and dried at 100°–110° C. Textiles so treated can be boiled in water for 3 hours and in 1 per cent potassium oleate for 1½ hours without losing their flameproofness. The finish cannot be leached out by water or organic solvents (dry-clean-proof).

A polymer can also be prepared, according to our above cited copending patent application, Serial No. 62,236, put on the cloth, and brominated thereupon according to this invention. In this case, the polymerization is carried out in the reaction vessel until the bromine number 150 is reached, whereupon the polymerization is inhibited, the monomer portion removed, the remaining polymer fraction of bromine number about 90 dissolved in ethylene dichloride, and put on the cloth. This process will be further illustrated by the following examples:

EXAMPLE III

Polymerization in bulk; bromination on cloth.

1.25 parts of benzoyl peroxide catalyst are dissolved in 100 parts of triallyl phosphate and the bulk heated at 90° C. for 45 minutes. At this stage the partially polymerized mixture is still soluble in a suitable solvent. After addition of 1.25 parts of hydroquinone to inhibit further polymerization, the entire bulk with a bromine number of 150 is dissolved in toluene to serve as the impregnating solution for the textile. Cotton impregnated with this solution is dried at 100°–110° C., passed into a bath containing equal parts of bromine and carbon tetrachloride, the excess bromine squeezed out, the cloth then passed into dilute alkali until neutral, rinsed with water, and dried at 100°–110° C.

Cotton textiles so treated were flameproof and retained this property upon boiling in water for 3 hours and upon boiling in water containing 1 per cent soap and 0.2 per cent soda ash for 1 hour.

EXAMPLE IV

Polymerization in bulk; removal of monomer; bromination on cloth.

1.25 parts of benzoyl peroxide catalyst are dissolved in 100 parts of triallyl phosphate and the bulk heated at 90° C. for 45 minutes. 1.25 parts of hydroquinone are added to inhibit further polymerization. Monomer is removed by distillation in vacuo, the polymerized residue has a bromine number of 90. The polymer is dissolved in ethylene dichloride.

Cotton impregnated with this solution is dried at 100°–110° C., then passed into a bath containing equal parts of bromine and carbon tetrachloride. The excess bromine is squeezed out, the cloth passed through dilute alkali until neutral, rinsed with water, and dried at 100°–110° C.

Cotton textiles so treated were flameproof and retained this property upon boiling in water for 3 hours and upon boiling in water containing 1 per cent soap and .2 per cent soda ash for 1 hour.

EXAMPLE V

Polymerization in solution; removal of monomer by distillation; and bromination on cloth:

1 part of triallylphosphate, 1 part of carbon tetrachloride and 0.0125 part of benzoyl peroxide catalyst are heated at reflux temperature for 1 hour. 0.0125 part of hydroquinone is added to inhibit further polymerization, and the carbon tetrachloride is removed by distillation. Approximately 40 per cent of the original triallyl phosphate remains unpolymerized and is removed by distillation in vacuo, leaving approximately 60 per cent of a polymer of bromine number 90. This polymer is then brought into solution in ethylene dichloride to serve as an impregnating solution for the textile. Cotton impregnated with this polymer is dried at 100°–110° C. and passed into a bath containing equal parts of bromine and carbon tetrachloride. The textile is subsequently dipped in 10 per cent aqueous ammonia, rinsed in water, and dried at 100°–110° C. Cotton textile containing 1 part of polymer film will add on approximately 0.75 part of bromine when treated in this manner and is flameproof, retaining this property after boiling in a solution of 1 per cent soap—0.2 per cent sodium carbonate for one hour.

EXAMPLE VI

Polymerization in solution. Monomer and low molecular weight material removed by addition of a poor solvent for the polymer. Bromination on cloth:

100 parts of triallyl phosphate are dissolved in 100 parts of ethylene dichloride, and 1½ parts of benzoyl peroxide are added. The material is refluxed for one hour. The bromine number, at this point, is about 150. An excess of carbon tetrachloride is added. The precipitated material is filtered off, vacuum dried, and redissolved in ethylene dichloride.

The textile is impregnated with this solution, then dried, and brominated as in Example I or II. A quantitative evaluation of tensile strength is shown in the following table:

It is important here to polymerize in a "good" solvent just prior to the point of gelation (bromine number 150) and then to precipitate the higher polymer while retaining in solution the monomer and very low molecular weight products.

Other "good" solvents are methyl ethyl ketone, methyl isobutyl ketone, cyclohexanone, ethylene dichloride, etc.

Variation in dilution, temperature of polymerization, and catalyst concentration will affect the time of gelation.

*Tensile strength measurements*

| Treatment | Average of 10 Samples Breaking Strength [1] | | | |
|---|---|---|---|---|
| | Initial | | Heat Treated [2] | |
| | Warp, lbs. | Fill, lbs. | Warp, lbs. | Fill, lbs. |
| Untreated Cotton | 56 | 22 | 25 | 12 |
| Cotton Treated As In Example I [3] | 60 | 47 | 28 | 15 |
| Cotton Treated As In Example VI [4] | 65 | 50 | 28 | 15 |

[1] Measured on Scott tensilometer according to Navy Department Specification 51T13.
[2] Heat treatment at 110° C. for 24 hours.
[3] Polymerization and bromination on cloth.
[4] Polymerized material put on cloth and brominated on cloth.

EXAMPLE VII

Polymerization in emulsion; putting emulsion on cloth; then brominating:

Polymerization of triallyl phosphate is carried out in emulsion and under reflux with vigorous stirring at 95° C. The desired degree of polymerization is reached in 105 minutes. The triallyl phosphate is emulsified with water using polyvinyl alcohol as an emulsifying agent. Calcium carbonate is added to maintain the necessary pH. Parts by weight are as follows:

| | Parts |
|---|---|
| Triallyl phosphate | 218 |
| Polyvinyl alcohol | 21.8 |
| Calcium carbonate | 21.8 |
| Benzoyl peroxide | 4.36 |
| Water | 3924 |

The textile to be flameproofed is impregnated with the above emulsion, dried, and brominated as in Example I or II. The resulting textile is flameproof and can resist laundering and drycleaning.

EXAMPLE VIII

Triallyl phosphate put on cloth from solution and completely brominated on cloth:

A solution of 30 parts of triallyl phosphate in 70 parts of acetone (or any other desired solvent, i. e., aromatic compounds, ketones, halogenated hydrocarbons, etc.) is prepared.

The textile is impregnated with this solution to obtain the desired pick-up; the fabric is then air-dried or even oven-dried at 80° C. to remove solvent.

The cloth is then passed through a bath of equal parts bromine and carbon tetrachloride, excess bromine is squeezed out. The cloth is dipped into dilute alkali, rinsed with water, and dried at 100°–110° C. Bromination, if carried out in the vapor-phase, is done as in Example II.

This treatment renders the textile flameproof.

EXAMPLE IX

Triallyl phosphate put on cloth from emulsion and completely brominated on cloth:

An emulsion is prepared by adding 10 parts of triallyl phosphate slowly with vigorous agitation to 1 part of polyvinyl alcohol dissolved in 18 parts of water. The textile to be treated is immersed in the emulsion, the excess squeezed out, and then dried at 100°–110° C. The cloth is then passed into a bath of equal parts bromine and carbon tetrachloride. After excess bromine is squeezed out, the cloth is dipped into dilute alkali, given a water rinse, and dried at 100°–110° C. Vapor bromination may be carried out as described in Example II.

This treatment provides the textile with a flameproof finish resistant to laundering.

Though halogenation through addition is preferred, halogenation through substitution is included in this process.

A soluble polymer prepared and brominated and put on the cloth without fractionation, according to our method as described in the aforesaid copending application Serial No. 62,236, was much less permanent than when the same polymer was put on the cloth before brominating, and then brominated directly on the cloth. We can advance some theories as to the explanation of this effect, one of them consisting in a cross-linking reaction accompanying the bromination on the fiber, i. e., on the cloth, but not in solution. This assumption has been somewhat strengthened by the observation that merely brominating triallyl phosphate on the cloth, without preceding polymerization, imparts a degree of permanence to the finish which, of course, is much lower than that accomplished by a preceding polymerization.

Instead of triallyl phosphate, other alkene phosphates, e. g., trimethallyl phosphate, and particularly dialkene amido phosphates, can be polymerized and halogenated on the cloth or part-polymerized prior to the application on the textile and then halogenated, particularly brominated.

The dialkene amido phosphates which are preferred are those represented by the following formula:

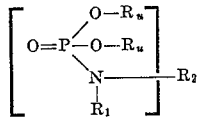

where $R_u$ represents an unsaturated aliphatic radical having from 3 to 5 carbon atoms; $R_1$ is selected from the class consisting of hydrogen, an alkyl radical having from 1 to 3 carbon atoms, an hydroxyalkyl radical having from 1 to 3 carbon atoms, and an unsaturated aliphatic radical having from 3 to 5 carbon atoms; and $R_2$ is selected from the class consisting of hydrogen, an unsaturated aliphatic radical having from 3 to 5 carbon atoms, and X, where X represents

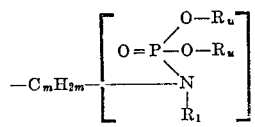

in which m is a small whole integer and $R_1$ and $R_u$ have the same meanings as before.

Specific examples of these compounds are diallyl phosphonamide, N-methylol diallyl phosphonamide, N-N'-methylene bis diallyl amido phosphate, N-allyl diallyl phosphonamide, N-diallyl diallyl phosphonamide, N-N'-ethylene bis diallyl amido phosphate, and dipropargyl phosphonamide.

The following example illustrates the use of these compounds according to the process of this invention:

EXAMPLE X

Polymerization of diallyl phosphonamide on the cloth and bromination on the cloth:

17.7 parts of diallyl phosphonamide are dissolved in 50 parts of methanol containing ½ part of benzoyl peroxide. The fabric is impregnated with this solution, dried, and then the monomer is part-polymerized at 90° C. under nitrogen. The bromination is carried out on the cloth using a solution of equal parts of bromine in carbon tetrachloride. Excess bromine is removed by passing through rollers and then neutralizing in a dilute alkali bath. The fabric is thoroughly rinsed and then dried at 100°–110° C.

The finish is flameproof and has resisted laundering and dry-cleaning.

Using similar proportions and following the methods as described in the previous examples, any of the aforementioned dialkene amido phosphates can be polymerized and/or halogenated on the cloth to furnish flameproof materials.

This process can also be carried out by copolymerizing halogenated alkene phosphates with a non-halogenated monomer of the same type or with a halogenated or non-halogenated monomer of another type. Thus, we could copolymerize triallyl phosphate with its bromo compound by introducing approximately one-eighth of a mole of bromine into triallyl phosphate and subsequently polymerizing.

Our process of polymerizing and/or halogenating organic phosphates on or in inflammable material is not limited to the compounds described above. The process is useful for any polymerizable organic phosphate which in the presence of halogen becomes an effective flameproofer. Dialkene phosphonamides as described above can be polymerized and subsequently brominated on textiles giving an effective flameproofing finish. The process is also applicable to polycondensation reactions carried out on the cloth, involving brominated organic phosphates containing at least two functional groups in the repeating unit.

We have found that brominated alkene phosphates, particularly hexabromo triallyl phosphate, represent by themselves effective flameproofers and flameproofing plasticizers when incorporated in a resinous binder. We have found that incorporation of hexabromo triallyl phosphate in triallyl phosphate monomer and impregnating textiles with a solution of the mixture and then polymerizing the triallyl phosphate on the cloth leads to a flameproofing finish which may be useful in applications where the high degree of permanence attained with the other methods described above is not essential.

EXAMPLE XI

Incorporation of brominated triallyl phosphate in triallyl phosphate monomer and polymerizing on the cloth:

Bromine is added to 218 parts of triallyl phosphate until 480 parts of bromine are absorbed. The resulting viscous oil is neutralized with dilute alkali and washed free of salts.

30 parts of this brominated triallyl phosphate are dissolved in a solution of 70 parts of triallyl phosphate in 150 parts of benzene or other suitable solvent containing 2 parts of benzoyl peroxide. The cotton material to be flameproofed is impregnated with this solution, dried, then polymerized under nitrogen at 90° C. for 3 hours.

The cotton textile is flameproof and retains this property after boiling in water for 1 hour or in 1 per cent potassium oleate solution for ½ hour.

It is to be noted that the pick-up of flameproofing substance on the textile is a function of the nature of the fabric, the type of weave, and the weight of the cloth per square yard. To make acetate rayon just flame-retardent according to CAA (Civil Aeronautics Administration) Regulation of October 1, 1946, a pick-up of about 10 per cent will be sufficient while about twice as much is needed for absolute flameproofness. Cotton of 8 ounces per square yard required about 20 per cent pick-up to satisfy the flame-resistance test according to the Navy Department Specification 51T13, and the laundering and dry-cleaning tests according to Federal Specification CCC-T-191a. For a large number of laundering cycles, or for lighter weight cotton, a somewhat higher pick-up (25 or 30 per cent) will be preferable, to be on the safe side, so that quite generally, the pick-up will vary from 10 to 40 per cent.

It is to be understood that certain changes, alterations, modifications, and substitutions can be made without departing from the spirit and scope of the appended claims.

We claim as our invention:

1. A process for flameproofing inflammable materials comprising impregnating the material to be flameproofed with a solution containing triallyl phosphate, brominated triallyl phosphate and a peroxide catalyst and polymerizing the solution in situ on the material.

2. A process for flameproofing inflammable materials comprising polymerizing a partly brominated triallyl phosphate in situ on the material to be flameproofed.

3. A normally inflammable material that has been flameproofed by impregnation with a partly brominated triallyl phosphate followed by polymerizing said partly brominated triallyl phosphate in situ on the material to form a flameproofing polymer thereon.

4. A process for flameproofing inflammable materials comprising contacting the materials to be flameproofed with a composition consisting essentially of a monomeric unsaturated partially-halogenated trialkenyl phosphate ester wherein the alkenyl radicals have from 3 to 5 carbon atoms each, and polymerizing the ester in situ on the material to be flameproofed; the halogen atoms present being selected from the class consisting of bromine and chlorine atoms.

5. A normally inflammable material that has been flameproofed by impregnating same with a composition consisting essentially of a monomeric unsaturated partially-halogenated trialkenyl phosphate ester wherein the alkenyl radicals have from 3 to 5 carbon atoms each, followed by polymerizing the ester in situ on the material to be flameproofed; the halogen atoms present being selected from the class consisting of bromine and chlorine atoms.

GEORGE E. WALTER.
IRWIN HORNSTEIN.
CLARENCE A. SHELD.

References Cited in the file of this patent

UNITED STATES PATENTS

| Number | Name | Date |
|---|---|---|
| 1,936,985 | Lommel et al. | Nov. 28, 1933 |
| 2,330,251 | Taylor | Sept. 28, 1943 |
| 2,332,900 | D'Alelio | Oct. 26, 1943 |
| 2,394,829 | Whitehill et al. | Feb. 12, 1946 |
| 2,421,218 | Pollak | May 27, 1947 |
| 2,425,766 | Toy | Aug. 19, 1947 |
| 2,453,168 | Toy | Nov. 9, 1948 |
| 2,478,441 | Wiley | Aug. 9, 1949 |

OTHER REFERENCES

Paint, Oil, & Chemical Review page 40, August 8, 1946.